United States Patent
Lindström et al.

(10) Patent No.: US 9,607,773 B2
(45) Date of Patent: Mar. 28, 2017

(54) DYE-SENSITIZED SOLAR CELL MODULE HAVING A SERIAL STRUCTURE AND A METHOD FOR MANUFACTURING THE SOLAR CELL

(71) Applicant: Exeger Sweden AB, Stockholm (SE)

(72) Inventors: Henrik Lindström, Åkersberga (SE); Giovanni Fili, Stockholm (SE)

(73) Assignee: Exeger Sweden AB, Stockholm (SE)

( * ) Notice: Subject to any disclaimer, the term of this patent is extended or adjusted under 35 U.S.C. 154(b) by 91 days.

(21) Appl. No.: 14/390,479

(22) PCT Filed: Mar. 8, 2013

(86) PCT No.: PCT/EP2013/054753
§ 371 (c)(1),
(2) Date: Oct. 3, 2014

(87) PCT Pub. No.: WO2013/149787
PCT Pub. Date: Oct. 10, 2013

(65) Prior Publication Data
US 2015/0083182 A1  Mar. 26, 2015

(30) Foreign Application Priority Data
Apr. 4, 2012 (SE) ...................... 1230033

(51) Int. Cl.
*H01G 9/20*  (2006.01)
(52) U.S. Cl.
CPC ......... *H01G 9/2081* (2013.01); *H01G 9/2068* (2013.01); *H01G 9/2077* (2013.01);
(Continued)
(58) Field of Classification Search
CPC .. Y02E 10/542; H01G 9/2077; H01G 9/2081; H01G 9/2009; H01G 9/2068
See application file for complete search history.

(56) References Cited

U.S. PATENT DOCUMENTS 6,069,313 A * 5/2000 Kay ...................... H01G 9/2031
136/244
2007/0079869 A1* 4/2007 Yukinobu ............ H01G 9/2022
136/263
(Continued)

FOREIGN PATENT DOCUMENTS

AU  2004-310583 B2  6/2005
EP  859386 A1  8/1998
(Continued)

OTHER PUBLICATIONS

Kim et al. "Synthesis of TCO-free Dye-sensitized Solar Cells with Nanoporous Ti Electrodes Using RF Magnetron Sputtering Technology." Journal of Electrical Engineering & Technology vol. 5, No. 1, pp. 146-150. 2010.*

*Primary Examiner* — James Lin
*Assistant Examiner* — Liesl C Baumann
(74) *Attorney, Agent, or Firm* — Dilworth & Barrese, LLP

(57) ABSTRACT

The present invention relates to a dye-sensitized solar cell module (1) which comprises at least two dye-sensitized solar cell units (2*a-c*) arranged adjacent to each other and connected in series. The dye-sensitized solar cell module comprises a porous insulating substrate (7), the first conducting layer (4) is a porous conducting layer formed on one side of the porous insulating substrate, and the second conducting layer (5) is a porous conducting layer formed on the opposite side of the porous insulating substrate. A series connecting element (6) is penetrating through the porous insulating substrate and extending between the first conducting layer of one of the cell units and the second conducting layer of the adjacent cell unit, thereby electrically connecting the first conducting layer of one of the cell units with the second conducting layer of the adjacent cell unit. This invention (Continued)

also relates to a method for manufacturing the dye-sensitized solar cell module.

19 Claims, 5 Drawing Sheets

(52) U.S. Cl.
CPC ......... *H01G 9/2009* (2013.01); *H01G 9/2031* (2013.01); *H01G 9/2059* (2013.01); *Y02E 10/542* (2013.01)

(56) References Cited

U.S. PATENT DOCUMENTS

| | | | |
|---|---|---|---|
| 2010/0229922 A1* | 9/2010 | Pettersson | 136/251 |
| 2010/0275976 A1* | 11/2010 | Rubin | H01L 31/02008 |
| | | | 136/251 |
| 2011/0220181 A1* | 9/2011 | Yang | 136/251 |
| 2012/0042930 A1* | 2/2012 | Yamanaka et al. | 136/244 |

FOREIGN PATENT DOCUMENTS

| | | |
|---|---|---|
| EP | 1689018 A1 | 8/2006 |
| EP | 1691442 A1 | 8/2006 |
| EP | 1708301 A1 | 10/2006 |
| EP | 2112710 A1 | 10/2009 |
| EP | 2421084 B1 | 2/2012 |
| EP | 2432069 A1 | 3/2012 |
| WO | 97/16838 A1 | 5/1997 |
| WO | 2011/096154 A1 | 8/2011 |
| WO | 2012/020944 A2 | 2/2012 |
| WO | 2012/045881 A1 | 4/2012 |

* cited by examiner

DYE-SENSITIZED SOLAR CELL MODULE HAVING A SERIAL STRUCTURE AND A METHOD FOR MANUFACTURING THE SOLAR CELL

FIELD OF THE INVENTION

The present invention relates to a dye-sensitized solar cell module having a serial structure comprising at least two dye-sensitized solar cell units arranged adjacent to each other and connected in series. The present invention also relates to a method for manufacturing dye-sensitized solar cells having a serial structure.

PRIOR ART

Dye-sensitized solar cells (DSC) have been under development for the last 20 years and work on similar principles as photosynthesis. Unlike silicon solar cells, these cells obtain energy from sunlight using dyes, which are abundant, cheap and environmentally unobtrusive.

A conventional sandwich type dye-sensitized solar cell has a few micrometer thick porous TiO2 electrode layer deposited onto a transparent conducting substrate. The TiO2 electrode comprises interconnected TiO2 metal oxide particles dyed by adsorbing dye molecules on the surface of the TiO2 particles and forming a working electrode. The transparent conducting substrate is normally a transparent conducting oxide deposited onto a glass substrate. The transparent conducting oxide layer serves the function as a back contact extracting photo-generated electrons from the working electrode. The TiO2 electrode is in contact with an electrolyte and another transparent conducting substrate, i.e. a counter electrode.

Sunlight is harvested by the dye, producing photo-excited electrons that are injected into the conduction band of the TiO2 particles and further collected by the conducting substrate. At the same time, I-ions in the redox electrolyte reduce the oxidized dye and transport the generated electron acceptors species to the counter electrode. The two conducting substrates are sealed at the edges in order to protect the DSC modules against the surrounding atmosphere, and to prevent the evaporation or leakage of the DSC modules inside the cell.

WO2012/020944 discloses a conventional sandwich type DSC module having a serial structure. The DSC module includes a plurality of DSC units arranged adjacent to each other and connected in series. Each DSC unit includes a working electrode including a first transparent conducting substrate adapted to face the sun and to transmit the sun light to a porous semiconductor layer containing an adsorbed dye and coated thereon, and a counter electrode including a second transparent conducting substrate having a conducting layer made of carbon or metal coated thereon. The serial structure of the DSC module includes patterns of the porous nanoparticle oxide layer and the conducting layer, which are formed in the working electrode and the counter electrode, respectively. Each of the nanoparticle oxide layer of the working electrode and the conducting layer of the counter electrode face each other to form a unit cell.

The unit cells are electrically insulated by protective barriers, and an electrolyte is filled between the working electrode and the counter electrode. The porous nanoparticle oxide layer of the working electrode and the conducting layer of the counter electrode are longitudinally displaced relative each other.

The working electrode on one side and the counter electrode on the other side are electrically interconnected by a series connecting element including a hole penetrating the working electrode and counter electrode which face each other, and conductive material filling the hole. The hole penetrates though the entire DSC module and is surrounded on both sides by protective barriers, which prevents the conductive material from contact with the electrolyte and accordingly prevents the conductive material from corrosion. The conductive material filled in the hole may be paste, adhesive, or an ink type and may be filled in the hole by means of printing, dropping, dispensing, jetting, stamping or sputtering. A problem with this type of DSC module is that it is difficult to produce a layer, which is conducting at the same time as it is transparent. A compromise between those demands always has to be done, which leads to decreased current-handling capability of the DSC module and accordingly reduced efficiency of the DSC module. Further, it is time consuming to drill the holes through each cell unit before they are filled with conductive materials, which increases the costs for manufacturing the DSC module. Another disadvantage with this DSC module is the need of protective barriers on each side of the series connecting element to prevent the conductive material from contact with the electrolyte. The protective barriers increase the manufacturing cost.

WO 2011/096154 discloses a DSC module including a porous insulating layer, a working electrode including a porous conducting metal layer formed on top of the porous insulating layer and creating a back contact, and a porous semiconductor layer containing an adsorbed dye arranged on top of the porous conducting metal layer, a transparent substrate facing the porous semiconductor layer, adapted to face the sun and to transmit the sun light to the porous semiconductor layer. The DSC module further includes a counter electrode including a conducting substrate arranged on a side opposite to the porous semiconductor layer of the porous insulating layer, and at a distance from the porous insulating layer, thereby forming a space between the porous insulating layer and the conducting substrate. An electrolyte is filled in the space between the working electrode and the counter electrode. The porous insulating layer is preferably made of a molded fiber glass compact. The porous conducting metal layer is formed from materials which are selected from a group consisting of Ti, W, Ni, Pt and Au. The porous conducting metal layer may be created using a paste including metallic particles which is applied on top of the porous insulating layer by printing, and followed by heating, drying and baking. An advantage with this type of DSC module is that the conducting layer of the working electrode is arranged between the porous insulating layer and the porous semiconductor layer. Thus, the conducting layer of the working cell does not have to be transparent, and can be made of a material of high conductivity, which increases the current-handling capability of the DSC module and ensures high efficiency of the DSC module.

In order to increase the voltage output from the dye-sensitized solar cell, it is a desire to have a serial structure including a plurality of dye-sensitized solar cell units connected in series. A disadvantage with the structure of the DSC module disclosed in WO2011/096154 is that it is difficult to provide serial connected DSC cell units. If the method disclosed in WO2012/020944 is used, holes must be made through the DSC module and filled with a conductive material. However, if the porous insulating layer is made of a sensitive material, such as a ceramic paper, the porous insulating layer may be shred upon drilling the holes.

Another disadvantage of using drilling to make holes is that drilling causes chips formation. It is difficult if not impossible to remove all chips produced by drilling. The remaining chips can cause problems when assembling the DSC modules because the chips consume a certain volume and space. Remaining chips at certain places can lead to inhomogeneous distance between the assembled layers or even malfunction or destruction of the assembled layers. Another problem with drilling is that the drilling tool can be abrased leaving traces of unwanted substances, which can interfere destructively with the performance of the DSC. It is, e.g., well known that the DSC is sensitive to trace amounts of iron and other metals that are used in drilling tools.

EP0859386 discloses a dye-sensitized solar cell including a porous insulating substrate, a working electrode, a first porous conducting layer for extracting photo-generated electrons from the working electrode formed on one side of the porous insulating substrate, and a counter electrode having a second porous conducting layer formed on the opposite side of the porous insulating substrate.

OBJECT AND SUMMARY OF THE INVENTION

It is an objective of the present invention to provide a low-cost DSC module having a serial structure.

This object is achieved by a dye-sensitized solar cell (DSC) module as defined herein.

The DSC module has a serial structure comprising at least two dye-sensitized solar cell units arranged adjacent to each other and connected in series. Each cell unit includes a working electrode, a first conducting layer for extracting photo-generated electrons from the working electrode, a counter electrode including a second conducting layer, an electrolyte for transferring electrons from the counter electrode to the working electrode, and a series connecting element for electrically connecting the working electrode or the counter electrode to a counter electrode or working electrode, respectively, of an adjacent cell unit.

The DSC module is characterized in that the solar cell module comprises a porous insulating substrate, the first conducting layer is a porous conducting layer formed on one side of the porous insulating substrate, and the second conducting layer is a porous conducting layer formed on the opposite side of the porous insulating substrate, and the series connecting element is a conducting layer penetrating through the porous insulating substrate and extending between the first conducting layer of a cell unit and the second conducting layer of an adjacent cell unit, thereby electrically connecting the first conducting layer of one of the cell units with the second conducting layer of the adjacent cell unit.

The conducting layers are porous conducting layers, which can be applied on both sides of the insulating substrate using a printing method, which leads to a lean production and significantly reduces the costs for manufacturing the DSC module. The series connecting element is formed by a conducting layer penetrating through the porous insulating substrate. Thus, the series connecting element can also be manufactured using a printing technique, which further reduces the costs for manufacturing the DSC module. Since the invention enables the use of a printing technique for manufacturing the series connecting element, it is no longer necessary to drill any holes through the entire DSC module, and thereby the risk for destroying the insulating substrate is eliminated. That makes is possible to use a sensitive material, such as a ceramic paper, as the porous insulating substrate. Using a printing technique, the series connecting element becomes a porous conducting layer.

Preferably, the conducting layer of the series connecting element is made of a non-corrosion sensitive, conductive material resistant to temperatures above 500° C. in air without oxidizing significantly, such as Ti, Ti alloys, Ni alloys, graphite, and amorphous carbon. By choosing a material that is non-corrosive it is not necessary to protect the series connecting element from contact with the electrolyte, and thus there is no need for any protective barriers surrounding the series connecting element. The series connecting element can be made of the same material as the first and second porous conducting layers, which facilitates the manufacturing process.

A further advantage with the DSC module according to the invention is that it is thin and has a compact architecture, which reduces the size of the DSC module. The fact that the component is thin and has a compact architecture makes it easier to provide series connection of the cell units.

The porosity of the insulating substrate and the conducting layers allows ionic transport through the layers and the substrate, and accordingly between the working electrode and the counter electrode. This structure makes it possible to arrange the working electrode on top of the first conducting layer and thus the first conducting layer does not have to be transparent, leading to an increased current-handling capability for the DSC module.

Preferably, the first and second conducting layers include particles, which are too large to be able to penetrate through the porous insulating substrate. This ensures that the first and second conducting layers do not penetrate through the porous insulating substrate and accordingly will stay on one side of the substrate.

Preferably, the thickness of the porous insulating substrate is between 4 μm and 100 μm. A thin substrate reduces the thickness of the series connecting element and accordingly reduces resistive losses. Further, a thin substrate makes it easy to arrange a series connecting element penetrating through the substrate.

Preferably, the first and second porous conducting layers are made of a non-corrosion sensitive, conductive material resistant to temperatures up to 500° C. in air without oxidizing, such as Ti, Ti alloys, Ni alloys, graphite, and amorphous carbon, to allow the conducting layers to be in contact with the electrolyte without any corrosion and to make it possible to sinter the conducting layer at temperatures about 450-550° C.

According to an embodiment of the invention, the porous conducting layer of the series connecting element contains particles small enough to penetrate through the porous insulating substrate. This embodiment ensures that the series connecting element will penetrate through the porous insulating substrate and thereby electrically connect the first and second conducting layers.

According to an embodiment of the invention, the first and second conducting layers of a cell unit are longitudinally displaced relative to each other to allow the conducting layer of the series connecting element to extend between one end of the first conducting layer of a cell unit and an opposite end of the second conducting layer of an adjacent cell unit. With opposite end is meant a front end of one end of the other layer is a rear end and vice versa. This means that the series connecting element extends between a front end of one of the conducting layers and a rear end of the other conducting layer. This embodiment makes it possible to manufacture the series connecting elements perpendicular to the extension plane of the insulating substrate, for example by a printing technique, which facilitates manufacturing of the DSC module.

According to an embodiment of the invention, each cell unit is surrounded by an ion barrier in the form of a non-porous layer penetrating through the porous insulating substrate to prevent the electrolyte from leaking to an adjacent cell unit. This embodiment avoids electrolyte migration between series connected neighboring cell units leading to losses in DSC efficiency. This embodiment enables the use of an electrolyte in liquid form. In another embodiment of the invention, the electrolyte can be in the form of a gel or in a solid form that immobilizes the electrolyte to prevent the electrolyte from leaking to an adjacent cell unit. With an adequate immobilization of the electrolyte, the ion barrier can be excluded.

According to an embodiment of the invention, the series connecting element is a porous conducting layer and the ion barrier penetrates through the series connecting element. The area of the working electrodes are denoted the active area of the solar cell module. The efficiency of the solar cell module depends on the relation between the active area and the total area of the solar cell module. By arranging the ion barrier through the series connecting element, which is positioned between the working electrodes of two adjacent solar cell units, no active area is used and accordingly the efficiency of the solar cell is maintained.

Preferably, the ion barrier is made of a polymer material. A polymer material can be melted and drained through the porous insulating substrate and the porous conducting layer of the series connecting element to fill the holes in the substrate, and thereby achieve a liquid barrier between the solar cell units, which prevents electrolyte to move from one solar cell unit to another solar cell unit. Alternatively, a liquid barrier between the solar cell units can be formed by soaking a liquid polymeric adhesive into the porous insulating substrate and the porous conducting layer of the series connecting element and thereafter curing the adhesive, e.g., chemically or by heat or by light.

It is another objective of the present invention to provide a cost effective method for manufacturing a dye-sensitized solar cell module having a serial structure.

This object is achieved by a method for manufacturing a dye-sensitized solar cell module as defined herein.

The method comprises applying the first conducting layers of the cell units in the form of porous conducting layers on one side of a porous insulating substrate, and applying the second conducting layers of the cell units in the form of porous conducting layers on the opposite side of the porous insulating substrate, such that the first and second conducting layers of each cell unit face each other.

This method makes it possible to use the same technique for manufacturing the working electrode and the counter electrode. The method also makes it possible to select a simple technique for manufacturing the working electrode and the counter electrode, such as screen printing, thereby simplifying the manufacturing of the DSC components and thus reducing the manufacturing costs.

This method makes it easy to manufacture a thin DSC component with a compact architecture.

According to an embodiment of the invention, the method comprises printing with an ink including conductive particles on at least two adjacent but separate areas on one side of the porous insulating substrate to form the first porous conducting layers, and printing with an ink including conductive particles on at least two adjacent but separate areas on the opposite side of the porous insulating substrate to form the second porous conducting layers. Using a printing technique, makes it is easy to provide a plurality of electrically separated areas of defined shapes on the insulated substrate, which areas form the first and second conducting areas of a plurality of DSC units.

According to an embodiment of the invention, the method further comprises forming series connecting elements in the form of conducting layers penetrating through the porous insulating substrate.

Since the conducting layer of the working electrode is formed as a porous conducting layer on one side of a porous substrate and the conducting layer of the counter electrode is formed as a porous conducting layer on the other side of the porous substrate, the series connecting element only has to penetrate through the porous substrate to be able to connect the working electrode of one cell unit with the counter electrode of an adjacent cell unit. Due to the porous material, the porous substrate is easy to penetrate. Thus, the step to drill holes through the entire DSC module can be omitted, which simplifies the manufacturing process and reduces the manufacturing costs.

By providing the series connecting element as a conducting layer penetrating the porous insulating substrate, a simple manufacturing technique, for example screen printing, can be used for manufacturing the series connecting element. The same manufacturing technique can be used for manufacturing the series connecting element and the conducting layers, thereby further reducing the manufacturing costs.

Preferably, the series connecting elements are formed by printing on the porous insulating substrate with an ink including conductive particles, which penetrates through the porous insulating substrate.

According to an embodiment of the invention, the method further comprises:

applying the first conducting layers of the cell units such that the first conducting layer of one of the cell units is electrically connected to the series connecting element, and the first conducting layer of an adjacent cell unit is electrically separated from the series connecting element, and applying the second conducting layers of the cell units such that the second conducting layer of one of the cell units is electrically separated from the series connecting element, and the second conducting layer of the adjacent cell unit is electrically connected to the series connecting element, thereby electrically connecting the first conducting layer of one of the cell units with the second conducting layer of the adjacent cell unit so that the cell units are connected in series.

According to an embodiment of the invention, the first and second layers are printed with an ink including conductive particles which are too large to be able to penetrate through the porous insulating substrate and the series connecting element is formed by printing on the porous insulating substrate with an ink including conductive particles small enough to penetrate through the porous insulating substrate. By selection of the size of the particles in the ink, it is possible to determine whether the porous layer will be provided on top of the porous insulating substrate, or if the layer will penetrate through the substrate. If the particle of the first and second conducting layer is larger than the pores in the substrate, the particles will stay on top of the substrate and if the particles are smaller than the pores in the substrate, the particles will penetrate through the substrate.

According to an embodiment of the invention, the series connecting element is formed by perforating the porous insulating substrate and pouring ink with conductive particles through the perforated part of the substrate. With the term perforated is meant a plurality of very small holes arranged on a line and through the substrate. By perforating the porous insulating substrate along distances where it is a desire to have the series connecting elements, the process to apply the ink is facilitated and it is also possible to use ink with the same particle size as is used for producing the first and second conducting layer. If, for example, a ceramic paper is used as the substrate it is easy to perforate the paper before applying the ink.

According to an embodiment of the invention, the method comprises: printing with an ink, including conductive particles on the porous insulating substrate to form the series connecting element, printing with an ink, including conductive particles, on at least two adjacent but separate first areas on one side of a porous insulating substrate to form the first porous conducting layers, such that the first area of one of the cell units is in electrical contact with the series connecting element and the first area of the other cell unit is electrically separated from the series connecting element, and printing with an ink including conductive particles on at least two adjacent but separate second areas on the opposite side of the porous insulating substrate to form the second porous conducting layers, such that the first and second areas are displaced lengthwise relative each other and so that the second area of the one of the cell units is electrically separated from the series connecting element and the second area of the other cell unit is in electrical contact with the series connecting element. It is advantageous to first print the series connecting element and then print the first and second conducting layers in contact with the series connecting element.

According to an embodiment of the invention, the method comprises providing an ion barrier in the form of a non-porous layer surrounding each cell unit in order to prevent the electrolyte from leaking to an adjacent cell unit. The non-porous layer penetrates through the porous insulating substrate. In order to maintain the active area of the solar cell, the polymer material may be positioned so that the polymer material penetrates through the series connecting element.

According to an embodiment of the invention, the ion barrier is provided by applying a polymer material so that the polymer material penetrates through the first conducting layer, the porous insulating substrate, and the second conducting layer.

According to an embodiment of the invention, the polymer material is applied so that the polymer material penetrates through the series connecting element.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1A:
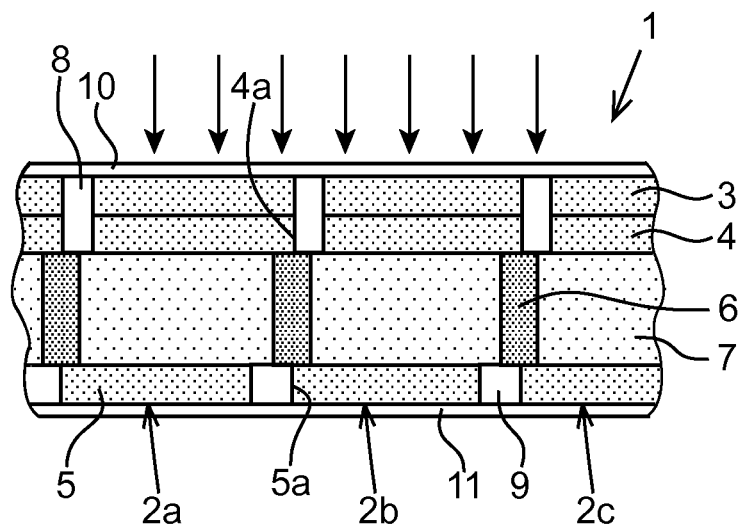
FIG. 1a shows a cross section through a dye-sensitized solar cell module according to a first embodiment of the invention.

FIG. 1a shows a cross section through a dye-sensitized solar cell (DSC) module 1 having a serial structure according to a first embodiment of the invention. The DSC module comprises a plurality of DSC units 2a-c arranged adjacent to each other and connected in series. Each DSC unit 2a-c includes a working electrode 3 and a counter electrode 5. The space between the working electrode and the counter electrode is filled with an electrolyte including ions for transferring electrons from the counter electrode to the working electrode. The counter electrode transfers electrons to the electrolyte. The DSC module comprises a first conducting layer 4 for extracting photo-generated electrons from the working electrode. The first conducting layer 4 serves as a back contact that extracts electrons from the working electrode. In the following, the first conducting layer 4 is named the back contact layer.

The working electrode 3 includes a porous TiO2 electrode layer deposited onto the first conducting layer 4. The TiO2 electrode comprises TiO2 particles dyed by adsorbing dye molecules on the surface of the TiO2 particles. The working electrode is positioned on a top side of the DSC module. The top side should be facing the sun to allow the sunlight to hit the dye molecules of the working electrode.

The DSC module further includes a porous insulating substrate 7 arranged between the working electrode and the counter electrode. The porosity of the porous insulating substrate will enable ionic transport through the substrate. Preferably, the porous insulating substrate is a ceramic microfiber-based substrate, such as a glass microfiber or a ceramic microfiber substrate. For example, the porous substrate is based on a glass textile combined with glass paper. This makes it possible to provide a thin and strong substrate. The ceramic substrates are electrical insulators, but are porous and thereby allow liquids and electrolyte ions to penetrate. The ceramic substrates can be handled in the form of sheets or in the form of rolls for a continuous process. The ceramic substrates are chemically inert, can withstand high temperatures, and are readily available, cheap and simple to handle in various process steps.

A suitable ceramic substrate can be based on a woven microfiber glass fiber made of glass yarn. Woven fibers are much stronger than non-woven fibers. Additionally, woven fibers are inherently much mechanically stronger compared to non-woven fibers. Additionally the thickness of woven fibers can be made very thin with maintained mechanical strength. However, woven fibers often have large holes, which allow a large amount of particles in the printed ink to pass right through the woven fiber in an uncontrolled way across the entire area of the woven fiber. This is an unwanted effect. In order to block the holes in the woven textile it is useful to deposit non-woven glass fibers on top of the woven textile. This can be done by soaking the woven textile in a solution containing glass fibers and then removing the solvent. If a binder such as colloidal silica is used together with the glass fibers then the non-woven glass fiber can stick stronger to the woven fiber and will form a continuous sticking film of non-woven glass fiber on top of the woven glass fiber. By depositing non-woven glass fibers on top of the woven fiber, it is possible to prevent that particles in the ink pass right through the woven fiber.

The thinner the porous substrate is, the better it is, since a small distance between the back contact and the counter electrode provide minimal losses in resistance. For the same reason a large degree of porosity is desirable. However, if the substrate is too thin and too porous, the mechanical strength of the substrate will be too low. Preferably, the thickness of the porous insulating substrate is larger than 4 µm and less than 100 µm. More preferably, the thickness of the porous insulating substrate is less than 50 µm. The thickness of the porous insulating substrate is typically between 10-30 µm. Preferably, the porosity of the substrate is larger than 40%. Preferably, the porosity of the substrate is close to 90%. Preferably, the porosity of the substrate is between 40 and 90%.

The back contact layer 4 is a porous conducting layer deposited on an upper side of the porous insulating substrate 7. When a porous conducting layer is used as a back contact, it is in direct contact with the working electrode. The counter electrode of each DSC unit 2a-c includes a second conducting layer 5, in the following named the counter electrode layer. The counter electrode layer 5 is a porous conducting layer deposited on the opposite (lower) side of the porous insulating substrate 7. The back contact layer 4 and the counter electrode layer 5 are separated physically and electrically by the porous insulating substrate 7 and therefore, they are not in direct physical and electrical contact. However, the back contact layer 4 and the counter electrode layer 5 deposited on the upper and lower sides of the porous insulating substrate of a DSC unit are electrically connected via ions penetrating the porous insulating substrate. The porosity of the porous conducting layers 4, 5 shall preferably be between 30% and 85%, or between 35% and 70%, or between 40% and 60%. Depending on which material is used for the porous conducting layers and which application method is used, the thickness of the layer can vary from around 1 micrometer up to 100 micrometers or from 1 micrometer to 50 micrometers.

When a porous conducting layer is used as a counter electrode, it is part of the counter electrode opposite to the working electrode. The counter electrode normally comprises a catalytic layer. The porous conducting layer acting as counter electrode can have a separate catalytic layer or have catalytic particles integrated in the porous conducting layer.

The DSC module includes a plurality of pairs of first and second porous conducting layers disposed on opposite sides of the porous insulating substrate. Each DSC unit includes a pair of first and second porous conducting layers. The first and second porous conducting layers of one DSC unit are position so that they face each other. A space 8 is formed between the working electrodes 3 and first conducting layers of adjacent cell units and a space 9 is formed between the counter electrodes 5 of adjacent cell units, in order to electrically separate the cell units.

As seen from the FIG. 1, the first and second porous conducting layers are Slightly longitudinally displaced relative each other such that a front end 4a of the first conducting layer 4 of a DSC unit 2a face a rear end 5a of the second conducting layer 5 of an adjacent DSC unit 2b.

The DSC unit further includes series connecting element 6, which extends between the ends 4a, 5a of the first and second conducting layers of adjacent cell units thereby electrically connecting the first conducting layer of one of the cell units with the second conducting layer of an adjacent cell unit. Thus, the series connecting element 6 electrically connects the counter electrode 4 of one cell unit to the working electrode 5 of an adjacent cell unit to create an electrical series connection of two DSC units to increase the output voltage.

The series connecting element 6 is a porous conducting layer penetrating through the porous insulating substrate 7 and extending between the back contact layer 4 of one of the cell units and the counter electrode layer 5 of an adjacent cell unit. The porous conducting layer 6 is used as an electrical series connecting layer, and is in direct physical contact with the back contact layer 4 and the counter electrode layer 5 of two adjacent DSC units. In the following, the porous conducting layer of the series connecting element 6 will be named the series connecting layer. The electrical series connecting layer penetrates the porous insulating substrate 7 and provides an electrical connection pathway between the top side of the porous insulating substrate and the bottom side of the porous insulating substrate. Since the thickness of the porous substrate is small, preferably in the order of a few µm, the path for the current to travel is short and accordingly, the demand on the conductivity of the series connecting layer is less than on the counter electrode layer 5 and the back contact layer 4.

The porous conducting layers 4, 5, 6 will have low electrical losses due to their low resistivity. The porosity of the porous conducting layers will enable ionic and dye transport through the layers. The deposition of porous conducting layers on a porous insulating substrate 7 enables building of DSC modules, including a plurality of electrically interconnected DSC units.

The materials forming the porous conducting layers 4-6 must have a suitable corrosion resistance as to withstand the environment in the DSC, and preferably also be resistant to temperatures above 500° C. in air without oxidizing. Preferably, the porous conducting layers 4-6 are made of a material selected from a group consisting of titanium, titanium alloys, nickel alloys, graphite, and amorphous carbon, or mixtures thereof. Most preferably, the porous conducting layers are made of titanium or a titanium alloy or mixtures thereof.

The DSC module 1 also includes a first sheet 10 covering a top side of the DSC module and a second sheet 11 covering a bottom side of the DSC module and acting as liquid barriers for the electrolyte. The first sheet 10 on the top side of the DSC module covers the working electrodes and needs to be transparent, allowing light to pass through. The sheets 10, 11 are, for example, made of a polymer material.

To avoid electrolyte migration between series connected neighboring DSC units 2a-c leading to losses in DSC efficiency, ions from the electrolyte are not allowed to move between neighboring units. One solution to this problem is to immobilize the electrolyte by creating a gel electrolyte of the electrolyte and thereby preventing the liquid electrolyte from flowing between adjacent DSC units. Another solution can be to deposit a non-liquid electrolyte, such as a solid conductor.

Figure 1B:
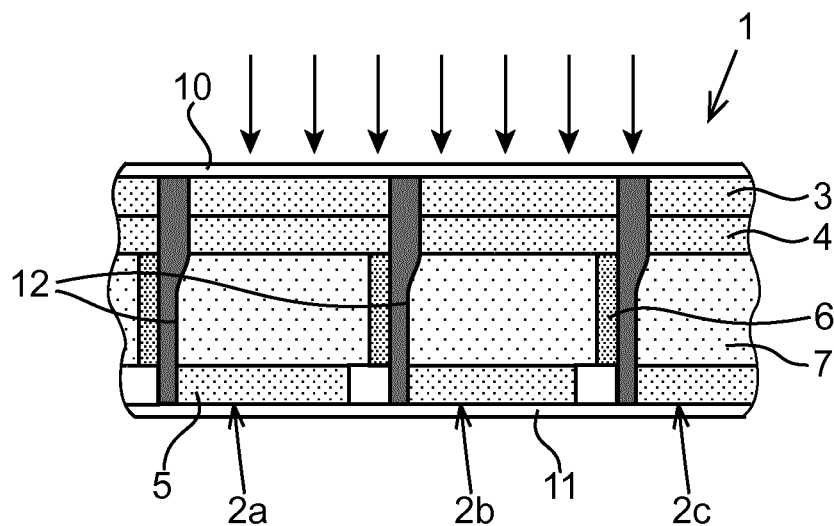
FIG. 1b shows a cross section through a dye-sensitized solar cell module according to a second embodiment of the invention.

FIG. 1b shows a cross section through a dye-sensitized solar cell module according to a second embodiment of the invention. In this embodiment, each cell unit is surrounded by an ion barrier 12 in the form of a non-porous layer penetrating through the DSC module. The ion barrier 12 surrounds the DSC unit in order to prevent the electrolyte from leaking to an adjacent cell unit, or coming in contact with the electrolyte in an adjacent cell unit. The ion barrier 12 is deposited in the space 8 between the working electrode layers 3 and the back contact layers 4 of adjacent cell units. The ion barrier 12 penetrates through the porous insulating substrate 7, and between the counter electrode layers 5 of adjacent cell units. Preferably, the ion barrier also penetrates through the series connecting layer 6. The ion barrier prevents ions from moving between adjacent cell units. However, it does not have any electrical insulating function. Thus, the first and second conducting layers 4,5, and the series connecting layer 6 are still conducting, although they are penetrated by the ion barrier. The ion barrier is, for example, made of a polymer material. For example, the ion barrier is made of the same polymer material as the first and second sheets 10,11.

In the following a cost-effective method for depositing porous conducting layers on upper and lower sides of a porous insulating substrate 7 in such a way that the porous conducting layers on the upper side of the porous insulating substrate are electrically interconnected with the porous conducting layers on the lower side of the porous insulating substrate will be described.

Further, it is described how such an arrangement of porous conducting layers can be used to provide a cost-effective method for producing a DSC module comprising several electrically interconnected DSC units.

For example, an electrical connection between a back contact layer and a counter electrode layer can be formed as follows: first an electrically series connecting layer is deposited so that it penetrates through a porous insulated substrate. Subsequently a back contact layer is deposited in such way that part of the back contact layer is deposited on top of the deposited series connecting layer such that the back contact layer is in direct contact with the series connecting layer. Subsequently a counter electrode layer is deposited on the opposite side of the porous insulating substrate in such way that a part of the counter electrode layer is deposited at the same lateral position as the series connecting layer, such that the counter electrode layer is in direct contact with the series connecting layer. Thus, the back contact layer on the upper side of the porous insulating substrate and the counter electrode layer on the lower side of the porous insulating substrate are electrically interconnected via the series connecting layer.

The porous conducting layer is, for example, formed by deposition of a deposit Comprising metal hydride particles onto a porous insulating substrate, and treating the deposit, so that the solid metal hydride particles transform into metal and the metal particles sinter to form a porous conducting layer. The deposit of metal hydride powder, for example titanium hydride powder, can advantageously be printed onto a ceramic microfiber-based substrate, such as a glass microfiber or a ceramic microfiber substrate. For the porous insulating substrates it is possible to form a porous conducting layer on both sides of the porous insulating substrate. For example, it is possible to form a porous conducting layer on one side of the substrate and another porous conducting layer on the other side of the substrate.

The porous conducting layers 4, 5, 6 can be disposed on the porous insulating substrate by printing with an ink including solid conductive particles. The solid particles can be mixed with a liquid to form an ink suitable for the printing process. The metal hydrides can be mixed with a liquid to form an ink suitable for the printing process. The particles may also be milled or otherwise treated in order to achieve a suitable particle size for forming the porous conducting layer. The solid particles are preferably metal based and can be pure metals, metal alloys or metal hydrides or hydrides of metal alloys or mixtures thereof. The resulting porous conducting layers must have a suitable corrosion resistance as to withstand the environment in the DSC. Example of a suitable material is titanium or titanium-based alloys or mixtures thereof. Other examples of suitable materials are nickel alloys.

Other components in solid form may also be added to the ink. For printing the deposit various techniques known in the art can be used. Examples of printing techniques are slot die coating, gravure, screen printing, knife coating, blade coating, doctor blading, flexo printing, dip coating or spraying. The dry powder deposition can be made by for example sieving or electrostatic powder deposition.

The deposit is treated by a heat treatment step. During the heat treatment a sintering of the particles also shall take place, thereby increasing the conductivity and the mechanical stability of the layer. Metal hydrides will transform to metal during the heat treatment. By heating in vacuum or inert gas, contamination of the particles is prevented, and electrical contact between particles improved.

A fast heating process, such as rapid thermal processing (RTP) or rapid thermal annealing (RTA), where the deposit is heated to high temperatures (up to 1200° C.) on a time scale of seconds, has advantages for avoiding contamination of the particles by the sintering atmosphere. Flash sintering can also be employed, i.e. using equipment such as Sinteron 2000, supplied by Polytec. Heat treatment temperatures shall be sufficient for sintering between the particles to take place. Temperatures depend on the material used, but are normally in the range of 700-1200° C.

To achieve a catalytic effect in the counter electrode, it is possible to mix in platinized particles of conductive metal oxides with the metal hydride particles, such as platinized ITO, ATO, PTO, and FTO. Platinized particles of conductive metal carbides, metal silicides and metal nitrides can also be mixed with the metal hydride particles. Also particles of platinized carbon black or graphite can be mixed with the metal hydride particles.

In the following, an example of a method to manufacture a DSC module having a serial structure will be explained with reference to the FIGS. 2-12.

Figure 2:
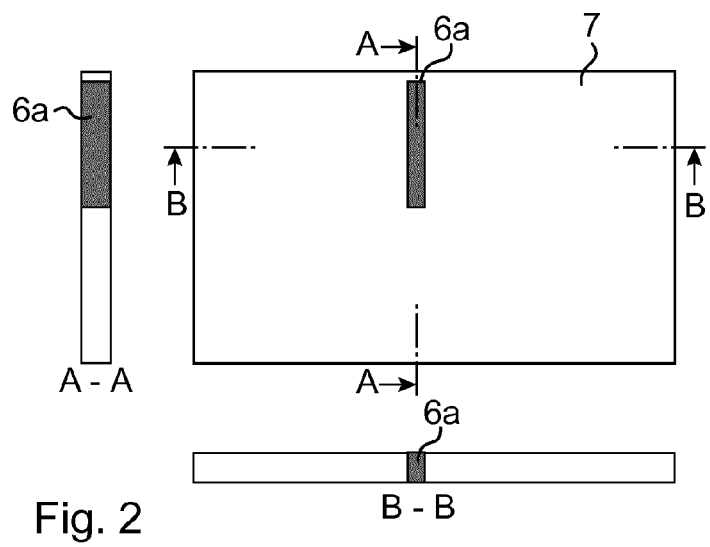
FIGS. 2-11 illustrate a method for manufacturing a dye-sensitized solar cell module according to an embodiment of the invention.

FIG. 2 shows a top view and two cross sections A-A and B-B of a porous insulating substrate 7 deposited with a series connecting layer 6a. In this example, the porous insulating substrate 7 is a ceramic microfiber. The cross sections illustrate that the series connecting layer penetrates the porous insulating substrate from the upper side to the lower side of the porous insulating substrate. This means that there is an electrical path from the upper side to the lower side of the porous insulating substrate. The series connecting layer 6a is printed with an ink containing particles that are small enough to penetrate the porous network inside the ceramic microfiber. The cross sections illustrate that the particles in the ink are penetrating the ceramic microfiber all the way from top to bottom of the substrate.

Figure 3:
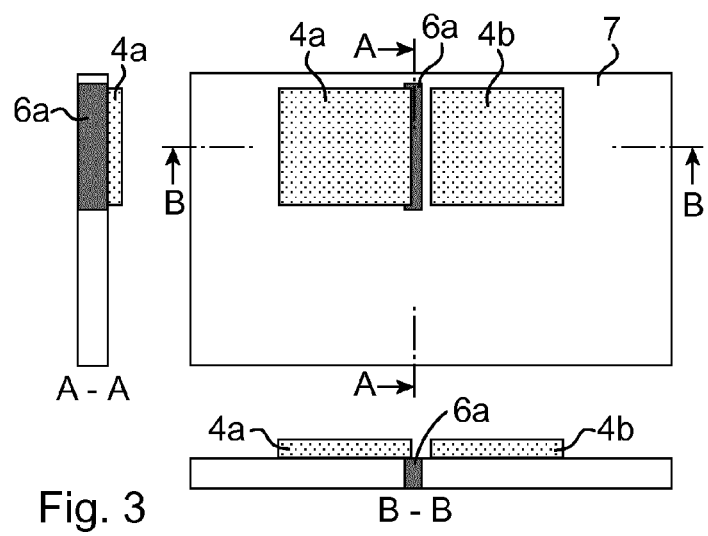

FIG. 3 shows a top view and two cross sections of the porous insulating substrate 7 deposited with a series connecting layer 6a that penetrates the porous insulating substrate. Additionally, two more porous conducting layers 4a-b are printed on the upper side of the insulating substrate 7 to form back contact layers. One of these back contact layers 4a is in direct contact with the series connecting layer 6a, as can be seen in the top view and the bottom cross section B-B, and the other back contact layer 4b is not in electrical contact with the series connecting layer 6a. It can be seen from the cross sections that the two layers 4a-b do not penetrate the insulating substrate 7 and that they are deposited on top of the insulating substrate 7 and are in contact with the insulating substrate 7. One of the layers 4a is in electrical contact with the penetrating layer 6a. The porous conducting layers 4a-b are printed with an ink including conductive particles which are too large to be able to penetrate through the porous network inside the ceramic microfiber.

Figure 4:
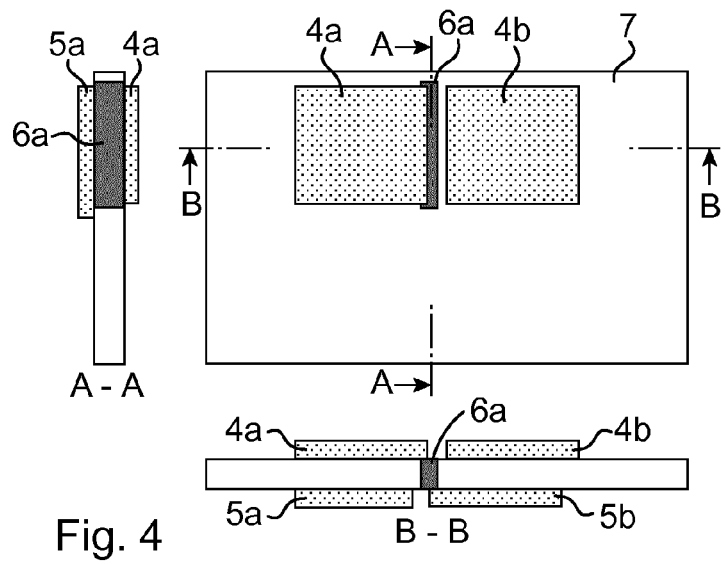

FIG. 4 shows a DSC module with two adjacent DSC units, which are series-connected. FIG. 4 shows a top view and two cross sections of the porous insulating substrate 7 deposited with the series connecting layer 6a and the back contact layers 4a-b printed on the upper side of the insulating substrate 7. Furthermore, two more layers 5a-b are printed on the other side of the substrate 7, i.e., the bottom side of the substrate to form counter electrode layers. The counter electrode layers 5a-b are not shown in the top view but only in the cross sectional views. The bottom cross sectional view B-B shows that one of the layers 5b printed on the bottom side of the insulating substrate 7 is in direct contact with the series connecting layer 6a and therefore in direct electrical contact with the series connecting layer 6a. This means that one of the counter electrode layers 5b is in electrical contact with one of the back contact layers 4a through the series connecting layer 6a. The porous conducting layers 5a-b are printed with an ink, including conductive particles which are too large to be able to penetrate through the porous network inside the ceramic substrate 7.

In many cases it is desirable to series connect a large number of DSC units to build up a high output voltage from the DSC module. In such cases, it is often desirable to design an electrical series connection direction pattern, such that the output terminals from the DSC units are physically positioned close to each other. An example of such pattern is shown in FIG. 12. The direction of the electrical series connection is indicated by the curved line. FIGS. 2-11 illustrate how this can be achieved.

Figure 5:
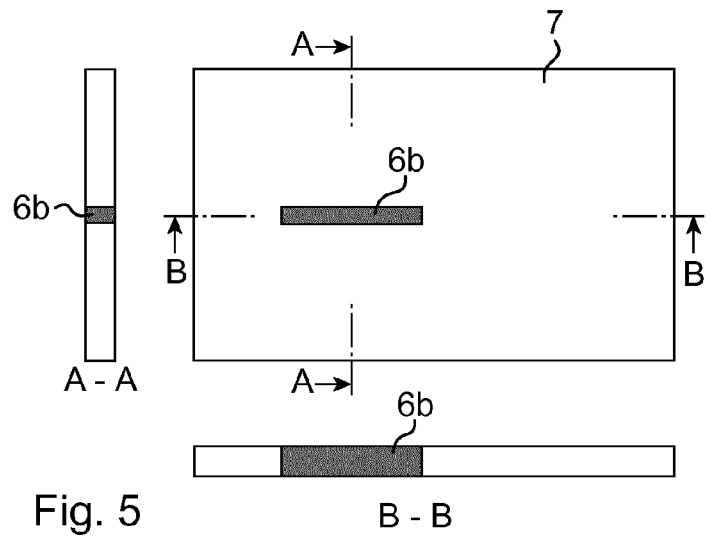

FIG. 5 shows a top view and two cross sections A-A and B-B of a porous insulating substrate 7 deposited with a series connecting layer 6b that penetrates the porous insulating substrate, and which is perpendicular to the series connecting layer 6a. The series connecting layer 6b is produced in the same way as the series connecting layer 6a, and preferably produced at the same time.

Figure 6:
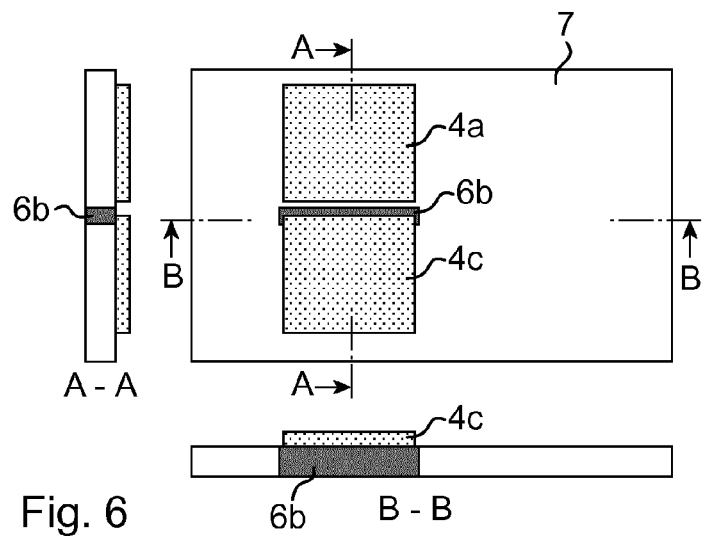

FIG. 6 shows a top view and two cross sections of the porous insulating substrate 7 deposited with the series connecting layer 6b. Additionally, two more porous conducting layers 4a and 4c are printed on the upper side of the insulating substrate 7 to form back contact layers. One of these back contact layers 4c is in direct contact with the series connecting layer 6b, as can be seen in the top view and the bottom cross section B-B, and the other back contact layer 4a is not in electrical contact with the series connecting layer 6b.

Figure 7:
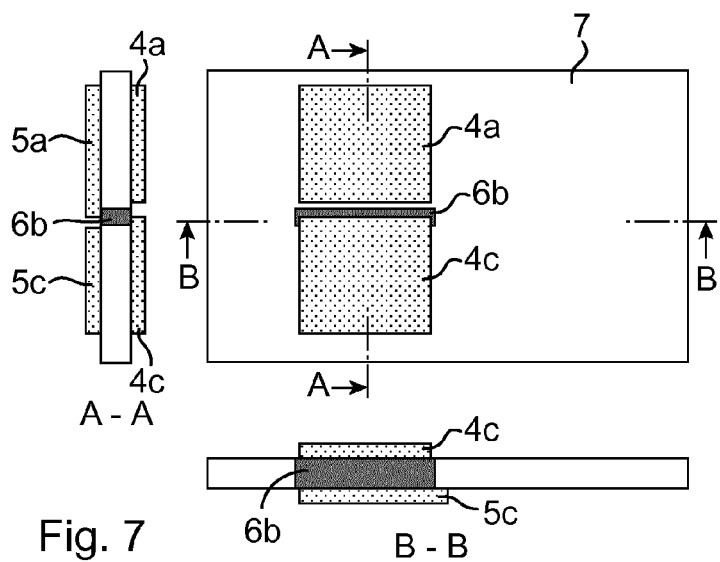

FIG. 7 shows a DSC module with two adjacent DSC units, which are series-connected. FIG. 7 shows a top view and two cross sections of the porous insulating substrate 7 deposited with the series connecting layer 6b and the back contact layers 4a and 4c. Furthermore, two more layers 5a and 5c are printed on the other side of the insulating substrate 7 to form counter electrode layers. The counter electrode layers 5a and 5c are not shown in the top view but only in the cross sectional views. The cross sectional view A-A shows that one of the counter electrode layers 5a and one of the back contact layers 4c are in direct contact with the series connecting layer 6b. This means that the counter electrode layer 5a is in electrical contact with the back contact layer 4c through the series connecting layer 6a.

Figure 8:
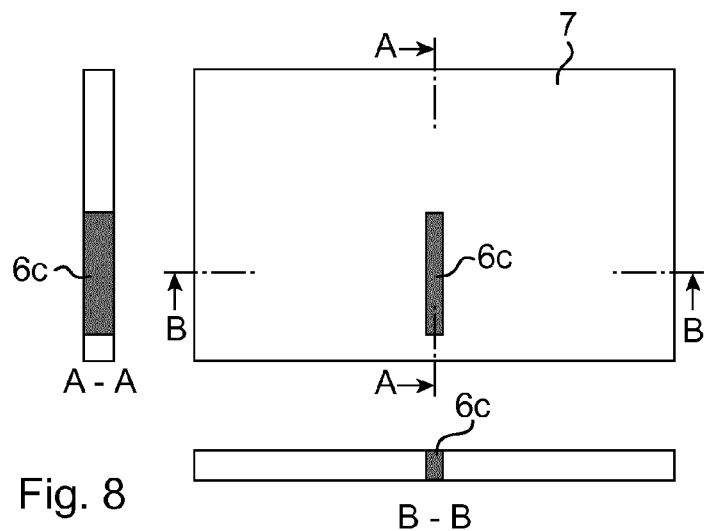

FIG. 8 shows a top view and two cross sections A-A and B-B of a porous insulating substrate 7 deposited with a series connecting layer 6c that penetrates the porous insulating substrate, and which aligns with the series connecting layer 6a and perpendicular to the series connecting layer 6b. The series connecting layer 6c is produced in the same way as the series connecting layer 6a and 6b, and preferably produced at the same time.

Figure 9:
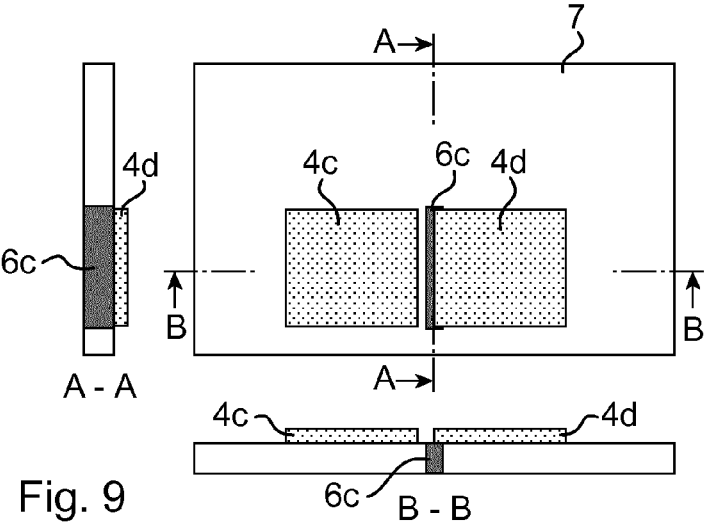

FIG. 9 shows a top view and two cross sections of the porous insulating substrate 7 deposited with the series connecting layer 6c. Additionally, two more porous conducting layers 4c and 4d are printed on the upper side of the insulating substrate 7 to form back contact layers. One of these back contact layers 4d is in direct contact with the series connecting layer 6c, as can be seen in the top view and the bottom cross section B-B, and the other back contact layer 4c is not in electrical contact with the series connecting layer 6c.

Figure 10:
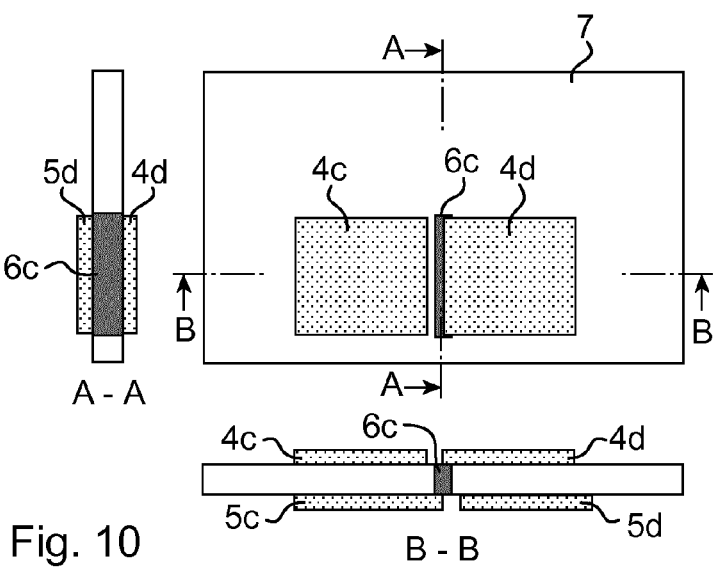

FIG. 10 shows a DSC module with two adjacent DSC units, which are series-connected. FIG. 10 shows a top view and two cross sections of the porous insulating substrate 7 deposited with the series connecting layer 6c and the back contact layers 4c and 4d. Furthermore, two more layers 5c and 5d are printed on the other side of the substrate to form counter electrode layers. The counter electrode layers 5c and 5d are not shown in the top view but only in the cross sectional views. The cross sectional view B-B shows that one of the counter electrode layers 5a and one of the back contact layers 4d are in direct contact with the series connecting layer 6c.

This means that the counter electrode layer 5c is in electrical contact with the back contact layer 4d through the series connecting layer 6c.

Figure 11:
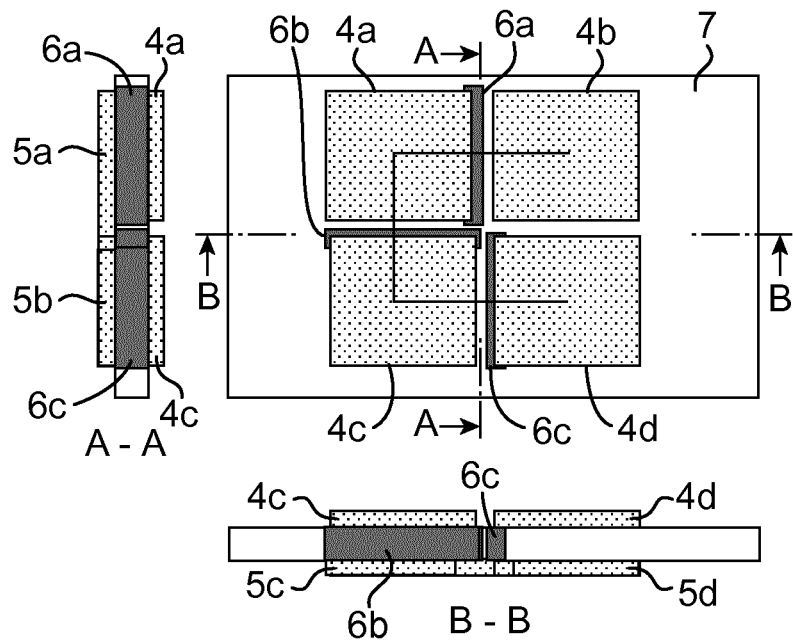
Figure 12:
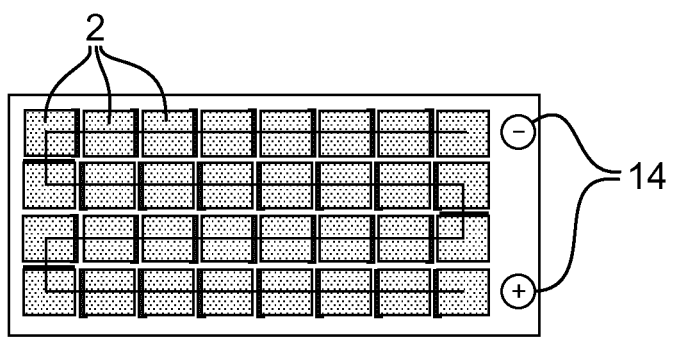
FIG. 12 shows an example of a dye-sensitized solar cell module according to an embodiment of the invention in a view from above.

FIG. 11 shows a DSC module with four adjacent DSC units which are series-connected by means of the series connecting layers 6a-c. The counter electrode layer 5b of a first DSC unit is connected to a back contact layer 4a of a second DSC unit via the series connecting layers 6a. The counter electrode layer 5a of the second DSC unit is connected to a back contact layer 4c of a third DSC unit via the series connecting layers 6b. The counter electrode layer 5c of the third DSC unit is connected to a back contact layer 4d of a fourth DSC unit via the series connecting layers 6c. Preferably, the series connecting layers 6a-c are printed on the insulating substrate 7 at the same time and in a first production step. The back contact layers 4a-d are printed on the insulating substrate 7 at the same time in a second production step and the counter electrode layer 5a-d are printed on the insulating substrate 7 at the same time in a third production step. However, it is possible to change the order in which the layers are produced. In a following step the printed layers are treated, for example by heating and sintering, to form porous conducting layers. Thereafter, the porous layers 3 of the working electrode are deposited on top of the back contact layers 4.

The insulating substrate 7 shown in FIG. 11 is printed with three deposits 6a-c of an ink containing particles that are small enough to penetrate the porous network inside the ceramic microfiber. Additionally, four more layers are printed on top of the insulating substrate 7 with an ink containing particles that are too large to penetrate the porous network inside the ceramic microfiber. Three of those four layers are in direct contact with a deposit of the penetrating ink, as can be seen in the top view. Therefore, three of these layers are in electrical contact with the respective penetrating layer. Furthermore, four more layers are printed on the other side of the insulating substrate 7, i.e., the bottom side of the insulating substrate 7 with an ink containing particles that are too large to penetrate the porous network inside the ceramic microfiber. The layers are not shown in the top view.

This means that one of the bottom layers is in electrical contact with one of the top layers through the penetrating layer. The figure shows that it is possible to change the direction of the electrical series connection. The direction of the electrical series connection is indicated by the curved line. The direction of the electrical series connection can be changed simply by printing penetrating ink at different locations on the insulating substrate 7 and by printing top layers and bottom layers in such a way that electrical series connection is obtained in the desired way.

FIG. 12 shows an example of a DSC module including a large number of DSC units connected in series such that the output terminals 14 from the units are physically positioned close to each other.

According to one embodiment of the invention, a DSC module comprising at least two dye-sensitized solar cell units arranged adjacent to each other and connected in series can be manufactured with a method comprising:

printing with an ink including conductive particles on at least two adjacent but separate first areas on one side of a porous insulating substrate to form first porous conducting layers, printing with an ink including conductive particles on at least two adjacent but separate second areas on the opposite side of the porous insulating substrate to form second porous conducting layers, the first and second areas are printed so that the first and second areas are displaced lengthwise relative to each other and the areas are printed with an ink having conductive particles, which are too large to be able to penetrate through the porous insulating substrate, forming a third conducting layer penetrating through the porous insulating substrate and extending between the first area of one of the cell units and the second area of the other cell unit, thereby electrically connecting the first conducting layer of one of the cell units with the second conducting layer of the other cell unit.

According to one embodiment of the invention, a DSC module comprising at least two dye-sensitized solar cell units arranged adjacent to each other and connected in series can be manufactured with a method comprising:

forming a series connecting element penetrating through a porous insulating substrate, printing with an ink including conductive particles, on at least two adjacent but separate first areas on one side of a porous insulating substrate to form the first porous conducting layers, such that the first area of one of the cell units is in electrical contact with the series connecting element and the first area of the other cell unit is electrically separated from the series connecting element, printing with an ink including conductive particles on at least two adjacent but Separate second areas on the opposite side of the porous insulating substrate to form the second porous conducting layers, such that the first and second areas are displaced lengthwise relative to each other such that a part of the first area of one of the cell units face a part of the second area of the other cell unit, and so that the second area of the one of the cell units is electrically separated from the series connecting element and the second area of the other cell unit is in electrical contact with the series connecting element.

EXAMPLES

Example 1

Back Contacts and Counter Electrode and a Series Connecting Layer on a Porous Ceramic Substrate A first ink is prepared by mixing TiH2 powder with terpineol. The ink is then bead milled for 3 hours at 8000 RPM using 0.6 mm zirconia beads. The zirconia beads are separated from the ink by filtration. The ink comprises TiH2 particles with a diameter smaller than 0.3 micrometer. Subsequently the ink is printed in the shape of a 3 mm wide and 10 cm long rectangle (see 6a in FIG. 2) onto a 15 µm thick, porous glass microfiber based substrate (see 7 in FIG. 2) and then dried at 200° C. for 5 minutes. The particle diameter of the TiH2 in the ink was small enough for the TiH2 to penetrate the pores in the porous glass microfiber based substrate (see cross sections A-A and B-B in FIG. 2). The first printed layer will form a series connecting layer. The porous glass microfiber substrate includes a 10 µm thick woven textile made of glass yarn coated with a 5 µm thick layer of non-woven glass fibers.

A second ink is prepared by mixing TiH2 with terpineol. The ink is then bead milled for 25 minutes at 6000 RPM using 0.3 mm zirconia beads. The zirconia beads are separated from the ink by filtration. The ink comprises TiH2 particles with a diameter that is smaller than 2 micrometer. Subsequently, the second ink is printed in the shape of two 10 cm wide and 12 cm long rectangles (see 4a and 4b in FIG. 3) onto a substrate (see 7 in FIG. 3) such that one edge of one of the 10 cm wide and 12 cm long rectangles (see 4a in FIG. 3) is printed directly on top of the 3 mm wide and 10 cm long rectangle (see 6a in FIG. 3). The edge of 4a in FIG. 3 is positioned roughly in the center of the rectangle (see 4a and 6a in FIG. 3). The second ink was then dried at 200° C. for 5 minutes. The second printed layers will form back contact layers.

A third ink is prepared by mixing TiH2 with terpineol. The ink is then bead milled for 25 minutes at 6000 RPM using 0.3 mm zirconia beads. The zirconia beads are separated from the ink by filtration. The ink comprises TiH2 particles with a diameter that is smaller than 2 micrometer. The filtered ink is then mixed with platinized conductive particles in order to make an ink for depositing counter electrodes. Subsequently the third ink is printed in the shape of two 10 cm wide and 12 cm long rectangles (see 5a and 5b in FIG. 4) onto the opposite side of the substrate (see 7 in FIG. 4), such that layers 5a and 5b in FIG. 4 face layers 4a and 4b in FIG. 4. The printed substrate was then dried at 200° C. for 5 minutes. The third printed layers will form counter electrodes.

Subsequently, the printed ceramic substrate was vacuum sintered at 585° C. and then allowed to cool down to room temperature. The pressure during sintering was lower than 0.0001 mbar. The sintered series connecting layer (6a FIG. 4) and back contacts (4a, 4b FIG. 4) and counter electrodes (5a, 5b FIG. 4) were electrically conducting. One of the back contacts (4a FIG. 4) was electrically connected with one of the counter electrodes (see 5b FIG. 4) via the series connecting layer (6a FIG. 4). The sheet resistance of the back contacts and the counter electrodes was below 0.2 ohms/square.

A variation of example 1 is that platinum free porous conducting layers are deposited on top of the platinum containing counter electrode layer. In such an arrangement, the first platinum containing layer would act as a separate catalytic layer.

Another variation of example 1 is that the ink for printing the series connecting layer comprises conducting tin oxides like FTO, ITO, or ATO.

Example 2

DSC Fabrication

The printed and sintered porous glass microfiber based substrate obtained from example 1 was immersed into a 0.02 M TiCl4 solution in water and heat treated at 70° for 30 minutes. The layer was removed from the TiCl4 solution and rinsed in water and then ethanol. Subsequently two layers of TiO2 based ink (3 in FIG. 1a) was printed on top of the back contacts (4a and 4b see FIG. 4 d) and then dried. The thickness of the dried TiO2 ink layer was 1-2 µm. A second 60 µm thick layer of TiO2 ink was printed directly on top of the first layer of TiO2 and dried. A third TiO2 layer was printed on top of the second TiO2 layer and dried. Subsequently, the structure was subjected to a heat treatment in air at 500° C. for 30 minutes. After allowing the structure to cool down; the structure was immersed in 0.02 M TiCl4 in water and heat treated at 70° C. for 30 minutes. After rinsing the TiO2 deposited ceramic substrate in water and ethanol, it was heat treated at 500° C. in air for 5 minutes. Subsequently the TiO2 deposited porous conducting layer structure was immersed in a solution of 20 mM Z907 dye in methoxypropanol and heat treated at 70° C. for 30 minutes and then rinsed in methoxy propanol. Thereafter electrolyte was deposited on top of 4a and 4b in the form of a gel and the cell was sealed by infiltrating a melted polymer at the edges around each DSC unit (see 12 in FIG. 1b) in the same time allowing for external electrical connection of the back contact of one DSC unit and external electrical connection of the counter electrode of the other DSC unit.

A variation of example 2 is that one or both of the TiCl4 treatments are omitted.

Another variation of example 2 is that the sealing around the edges of each DSC unit is printed by using a printable polymer or pre-polymer, where the pre-polymer could be chemically curable, light curable or heat curable.

The present invention is not limited to the embodiments disclosed but may be varied and modified within the scope of the following claims. Although, the steps of the invention are mentioned in the claims in a certain order, the claims are not limited to this order. For example, it does not matter whether the first or the second conducting layers are applied first. It is also possible to provide one or both of the first and second conducting layers on the porous insulating substrate, before the porous insulating layer of the series connecting element is formed in the substrate.

Further, as an alternative to forming the series connecting element by printing on the porous insulating substrate with an ink including conductive particles small enough to penetrate through the porous insulating substrate, the porous insulating substrate can be perforated beforehand and the printing is made along the perforated parts with an ink including conductive particles. The ink and the conductive particles will penetrate through the perforated parts of the substrate. This method is not dependent on the size of the particles in the ink.

It is also possible to have one or more porous layers between the porous insulating substrate and the porous back contact layer.

The invention claimed is:

1. A dye-sensitized solar cell module (1) having a serial structure comprising
a porous insulating substrate (7) forming a porous network and at least two dye-sensitized solar cell units (2a-c) arranged adjacent to each other and connected in series, each cell unit including:
a working electrode (3),
a first porous conducting layer (4) for extracting photogenerated electrons from the working electrode (3) and formed on one side of and in direct physical contact with the porous insulating substrate (7),
a counter electrode (5) including a second porous conducting layer formed on an opposite side of and in direct physical contact with the porous insulating substrate (7),
an electrolyte permeating said porous network for transferring electrons from the counter electrode (5) to the working electrode (3), and
a series connecting element (6) for electrically connecting the counter electrode (5) to the working electrode (3) located in an adjacent cell unit, wherein
the series connecting element (6) is a third porous conducting layer comprising a plurality of conducting particles penetrating through said porous network of the porous insulating substrate (7) and forming an electrical path from an upper side to a lower side of the porous insulating substrate (7) and disposed to electrically interconnect the first porous conducting layer (4) of one of the cell units and the second porous conducting layer (5) of the adjacent cell unit,
the series connecting element is in direct physical contact with a first portion of the porous insulating substrate corresponding to one of the cell units and in direct physical contact with a second portion of the porous insulating substrate corresponding to the adjacent cell unit, and
the series connecting element (6) extends through the porous insulating substrate (7) perpendicularly between the first porous conducting layer (4) of one of the cell units and the second porous conducting layer (5) of the adjacent cell unit.

2. The dye-sensitized solar cell module (1) according to claim 1, wherein said first (4) and second (5) porous conducting layers are made from a material selected from a group consisting of titanium, titanium alloys, nickel alloys, graphite, and amorphous carbon, or mixtures thereof.

3. The dye-sensitized solar cell module (1) according to claim 1, wherein said conducting particles of the series connecting element (6) are made of a material selected from a group consisting of titanium, titanium alloys, nickel alloys, graphite, amorphous carbon, or mixtures thereof.

4. The dye-sensitized solar cell module (1) according to claim 1, wherein the first porous (4) and second porous (5) conducting layers of a cell unit are longitudinally displaced relative to each other to allow said conducting layer of the series connecting element (6) to extend between one end of the first porous conducting layer of a cell unit and an opposite end of the second porous conducting layer of an adjacent cell unit.

5. The dye-sensitized solar cell module (1) according to claim 1, wherein the porous insulating substrate constitutes a single porous insulating substrate (7) common to all said cell units (2a-c).

6. The dye-sensitized solar cell module (1) according to claim 5, additionally comprising a first space (8) extending entirely between adjacent working electrodes (3) and first porous conducting layers (4) and a second space (9) extending entirely between adjacent second porous conducting layers (5) to laterally separate adjacent cell units.

7. The dye-sensitized solar cell module (1) according to claim 6, comprising
four adjacent solar cell units series connected by three said series connecting elements arranged with an intermediate series connecting element (6b) extending perpendicularly to said two other series connecting elements (6a, 6c).

8. The dye-sensitized solar module according to claim 1, wherein the porous insulating substrate (7) is ceramic and has a thickness between 4 and 100 microns.

9. A method for manufacturing a dye-sensitized solar cell module (1) comprising
a porous insulating substrate (7) forming a porous network and at least two dye-sensitized solar cell units (2a-c) arranged adjacent to each other and connected in series, each cell unit including:
a working electrode (3),
a first porous conducting layer (4) for extracting photo-generated electrons from the working electrode (3) and formed on one side of and in direct physical contact with the porous insulating substrate (7),
a counter electrode (5) including a second porous conducting layer formed on an opposite side of and in direct physical contact with the porous insulating substrate (7),
an electrolyte permeating said porous network for transferring electrons from the counter electrode (5) to the working electrode (3), and
a series connecting element (6) for electrically connecting the counter electrode (5) to the working electrode (3) located in an adjacent cell unit, wherein
the series connecting element (6) is a third porous conducting layer comprising a plurality of conducting particles penetrating through said porous network of the porous insulating substrate (7) and forming an electrical path from an upper side to a lower side of the porous insulating substrate (7) and disposed to electrically interconnect the first porous conducting layer (4) of one of the cell units and the second porous conducting layer (5) of the adjacent cell unit,
the series connecting element is in direct physical contact with a first portion of the porous insulating substrate corresponding to one of the cell units and in direct physical contact with a second portion of the porous insulating substrate corresponding to the adjacent cell unit, and
the series connecting element (6) extends through the porous insulating substrate (7) perpendicularly between the first porous conducting layer (4) of one of the cell units and the second porous conducting layer (5) of the adjacent cell unit, wherein
the method comprises:
applying the first porous conducting layers of the cell units on one side of the porous insulating substrate (7),
applying the second porous conducting layers of the cell units on the opposite side of the porous insulating substrate, such that the first and second porous conducting layers of each cell unit face each other, and
forming the series connecting elements (6) in the form of the conducting particles penetrating through the porous network of the porous insulating substrate (7), extending perpendicularly between the first porous conducting layer (4) of one of the cell units and the second porous conducting layer (5) of the adjacent cell unit.

10. The method according to claim 9, wherein the method comprises:
printing with a first ink including first conductive particles on at least two adjacent but separate areas on one side of the porous insulating substrate (7) to form the first porous conducting layers (4), and
printing with a second ink including second conductive particles on at least two adjacent but separate areas on the opposite side of the porous insulating substrate to form the second porous conducting layers (5).

11. The method according to claim 10, wherein the first ink and the second ink are the same.

12. The method according to claim 9, wherein said first (4) and second (5) porous conducting layers are made from a material selected from a group consisting of titanium, titanium alloys, nickel, nickel alloys, graphite, and amorphous carbon, or mixtures thereof.

13. The method according to claim 9, wherein the first (4) and second (5) porous conducting layers are printed so that the first and second conducting layers are displaced lengthwise relative each other.

14. The method according to claim 9, wherein the method further comprises:
applying the first porous conducting layers (4) of the cell units, such that the first porous conducting layer of one of the cell units is electrically connected to the series connecting element (6), and the first porous conducting layer of an adjacent cell unit is electrically separated from the series connecting element, and
applying the second porous conducting layers (5) of the cell units, such that the second porous conducting layer of said one of the cell units is electrically separated from the series connecting element, and the second porous conducting layer of said adjacent cell unit is electrically connected to the series connecting element, thereby electrically connecting the first porous conducting layer of one of the cell units with the second porous conducting layer of the adjacent cell unit so that the cell units are connected in series.

15. The method according to claim 9, wherein said series connecting elements (6) are formed by printing on the porous insulating substrate (7) with an ink including said conducting particles, which penetrates through the porous insulating substrate.

16. The method according to claim 9, wherein said series connecting element (6) is formed by perforating selected parts of the porous insulating substrate (7) and printing with an ink including said conducting particles on the perforated parts of the porous insulating substrate.

17. The method according to claim 9, wherein said series connecting elements (6) are formed by printing on the porous insulating substrate (7) with an ink including said conducting particles made of a material selected from a group consisting of titanium, titanium alloys, nickel, nickel alloys, graphite, and amorphous carbon, or mixtures thereof.

18. The method according to claim 9, wherein the method comprises:
printing with a first ink including said conducting particles on the porous insulating substrate (7) to form said series connecting element (6),
printing with a second ink including first conductive particles on at least two adjacent but separate first areas on one side of a porous insulating substrate to form said first porous conducting layers (4), such that the first area of one of the cell units is in electrical contact with said series connecting element and the first area of the other cell unit is electrically separated from the series connecting element, and printing with a third ink including second conductive particles on at least two adjacent but separate second areas on the opposite side of the porous insulating substrate to form said second porous conducting layers (5), such that the first and second areas are displaced lengthwise relative to each other, and the second area of said one of the cell units is electrically separated from the series connecting element and the second area of said other cell unit is in electrical contact with said series connecting element.

19. The method according to claim 18, wherein the second ink and the third ink are the same.

* * * * *